United States Patent Office 3,037,039
Patented May 29, 1962

3,037,039
ORGANO-TIN COMPOUNDS OF ORGANIC AMINES
Paul A. Mazur, Dumont, N.J., assignor to S & M Chemicals, Ltd., Ridgewood, N.J., a partnership
No Drawing. Filed May 19, 1958, Ser. No. 735,976
4 Claims. (Cl. 260—429.7)

This invention relates to new compositions of matter comprising organo-tin compounds of organic amines. More specifically, it deals with reaction products of organo-tin compounds with organic amines, including condensates of oxy compounds and amines of a rosin, and to non-therapeutic germicidal and fungicidal compositions containing the same.

Among the organic amine compounds useful for preparation of the organic tin compounds of the present invention are included the primary, and/or secondary and/or tertiary amines of the aliphatic, aromatic, hydroaromatic, alkylaryl, and heterocyclic species, as well as polymeric amines. The amines may contain oxy, halo, sulfur-containing (mercapto, etc.), imine, glyoxalidine, hydroxy, and/or quaternary ammonium (such as N,N-diethylaminoethyl-N',N',N'-tri-methyl ammonium chloride) and other organic substituent groups. Examples of suitable amino compounds are 2 - amino - 2 - ethyl-1,3-propanediol, amines sold commercially under the "Ethomeen" brand, exemplified by $C_{12}H_{25}NH(C_2H_4O)_4C_2H_4OH$ (Ethomeen C–15), $C_{12}H_{25}NH(C_2H_4O)_9C_2H_4OH$ (Ethomeen C–20), $C_{12}H_{25}NHC_2H_4OC_2H_4OH$ (Ethomeen C–12), $C_{12}H_{25}NH(C_2H_4O)_{14}C_2H_4OH$ (Ethomeen C–25), and $C_{18}H_{33}NHC_2H_4OC_2H_4OH$ (Ethomeen S–12), heterocyclic compounds containing reactive primary and/or secondary and/or tertiary nitrogen atoms within the nucleus or on substituent groups, diethanolamine condensates, such as diethanolamine-coconut fatty acid condensate, triallyl amine, triethanolamine, pyridine, tris (hydroxymethyl) amino methane, amines sold under the "Armeen" brand, as exemplified by $(C_{12}H_{25})_2NH$ (Armeen 2–C), dimethylaniline, amines sold under the "Duomeen" brand, as exemplified by $C_{18}H_{35}NHC_3H_7NH_2$ (Duomeen–T) and $C_{12}H_{25}NHC_3H_7NH_2$ (Duomeen C), lauryl dimethyl amine, tris (hydroxymethyl) aminomethane $[(CH_2OH)_3CNH_2]$, and the like.

The organo tin compounds to be reacted with the amines include quaternary organo-tin compounds in which tin atoms are attached directly to alkyl, aryl, alkylaryl, alkenyl, alkynyl, alkadienyl, alkatrienyl, alkapolyenyl, alkapolyenynyl, alkenynyl, substituted aryl, substituted arylalkyl, hydroxyalkyl or alkoxyalkyl groups and combinations thereof, as exemplified by tributyl tin chloride, triallyl tin chloride, trimethallyl tin chloride, tribenzyl tin chloride, triphenyl tin chloride, ethoxyethyl dibutyl tin chloride, hydroxymethyl diphenyl tin chloride, tributyl tin bromide, tri-hexadienyl tin chloride, tri-linolenyl tin chloride, tri-octadecyltetraenyl tin chloride, tri-diacetylenyl tin chloride, tri-octadecyltetraene-15, 16-ynyl tin chloride, tri-octynyl tin chloride, triphenyl tin bromide, tri-p-chlorophenyl tin chloride, tritolyl tin chloride, tri-p-trifluoromethyl phenyl tin chloride, tri-p-nitrotolyl tin chloride, trinaphthyl tin bromide, tristyryl tin bromide, and the like. Besides the chloride, the anion may be another halogen, acetate, sulfate, bromide, formate, hydroxyacetate, mono-, di-, or tri-chloracetate, acid sulfate, monoalkyl sulfate, mono- or di-acid phosphate, mono- or di-alkyl phosphate, and the like.

Of particular value are the organometal derivatives produced by reacting organo-tin compounds with condensates of oxirane compounds and amines of a rosin. In the distillation of turpentine oil, crude turpentine, turpentine oil or tall oil, a rosin type of residue is obtained, an important constituent of which is abietic acid. From this residue there may also be obtained, by well-known methods, dehydroabietic acid and other rosin compounds. Such rosin and rosin compounds (all of which will be referred to as "rosin") may be aminated, by methods familiar in the art, to produce amines which are marketed commercially as rosin amines.

Rosin amines have been found to condense with condensible organic compounds containing an oxirane radical to produce condensates of various structures and compositions, depending upon the nature of the compounds condensed, their properties, and the number of moles and/or types of rosin amines and/or condensible compounds involved in the reaction. For example, when dehydroabietylamine (I), which is marketed commercially under the trade name "Rosin Amine D," is condensed with ethylene oxide (II), there are formed an N-substituted monoethanol derivative (III), an N-substituted diethanol derivative (IV), and polyethylene glycol ethers of the diethanol derivative (V), roughly in accordance with the following reaction:

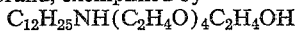

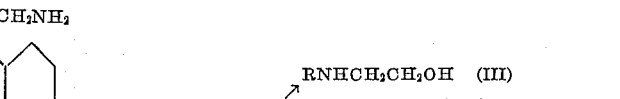

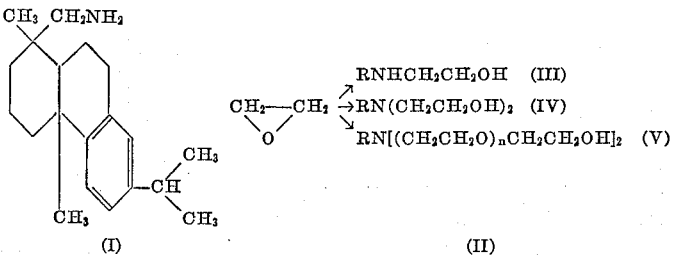

(I)   (II)

These condensates or adducts are being marketed commercially under the trade name "Polyrad." R represents the dehydroabietylamine radical, less the amino group.

The present invention involves reacting these latter condensates or adducts with an organo-metal moiety containing tin to produce highly valuable compounds suitable for non-therapeutic use in fungicidal, bactericidal, insecticidal, algaecidal, phytocidal and other such compositions. Broadly, such compounds may be represented by the formula:

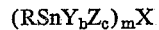

wherein R represents an organic group of the class consisting of alkyl, alkenyl, alkynyl, aralkyl, aryl, alkadienyl, alkatrienyl, alkapolyenyl, alkapoyenynyl, alkenynyl, substituted aryl, substituted arylalkyl, hydroxyalkyl, and alkoxyalkyl radicals, Sn represents an atom of tin originating from an organo-tin anion compound, said atom being attached directly to a carbon atom of R, Y represents an amine adductive with Z, Z represents an adductive compound containing an oxirane group, reactive with Y, X represents an anion when originating from said anion compound, $b$ is a numeral ranging from 1 to 140, representing the molal proportion of Y employed in the reaction, $c$ is a numeral ranging from 0 to 40, representing the molal proportion of Z, while $m$ is a numeral ranging from 1 to 3.

From the foregoing, it is apparent that "$b$" and "$c$" need not be whole numbers and that "$c$" may be zero, in which case the last-given formula would be written as:

$$(R_3SnY_b)_mX$$

When Y is a primary or secondary amine reacting with $R_3SnX$, an amine salt of the organo-metallic compound is formed. Tertiary amines, upon reaction with metallo-organic compounds bearing an anion, produce with said metallo-organic compound a quaternary compound.

As examples of the type of organic groups which have been found, useful for the radical "R," are methyl, ethyl, propyl, butyl, lauryl, allyl, methallyl, propargyl, benzyl, ethoxyethyl, hydroxy-ethyl, hexadienyl, linolenyl, octadecyltetraenyl, diocetylenyl, octadecyltetraene-15,16-ynyl, phenyl, octynyl, p-chlorophenyl, tolyl, p-trifluoromethyl-phenyl, p-nitrotolyl, naphthyl, styryl and the like radicals. Compounds suitable as "Z" compounds include ethylene oxide, propylene oxide, butylene oxide, butadiene dioxide, styrene oxide, epichlorohydrin, and the like. Although low molecular weight condensible oxy compounds of molecular weight below about 200 are most desirable, higher molecular weight compounds may be employed.

The preferred method for the preparation of the compounds of the present invention involves the mixing of the required quantity of the organotin compound, such as tributyl tin chloride (hereinafter referred to as TBTC), with the organic amine, followed by heating for about two hours in a suitable vessel. The product may be employed as such, or purified by conventional methods for use in agricultural and industrial outlets. "Rosin Amine D" will be indicated herein as "RAD."

The examples given in Table I illustrate many of the novel phases of the present invention. The first column after the example number lists the amount of tributyl tin chloride (TBTC) reacted with the specified amount of amine in the next two columns. The following column specifies the physical state of the reaction product, while the succeeding column indicates the molecular weight of the reaction product. In the last column, the germicidal activity of the reaction product is specified as the average of three experimental values. The data were obtained by steeping for 5 minutes cotton disks (10 mm. diameter) in a 0.1% alcoholic solution of the germicide, rinsing, and drying. The disks were then placed in "Difco" nutrient agar seeded with *S. aureus* (24-hour culture in nutrient broth) and the plates were incubated at 37° C. for 24 hours. The zones of inhibition around the disks were measured in millimeters.

*Table I*

| Example No. | TBTC, gm. | Amine | Gm. | State | Mol. Wt. | Inhibition Zone, mm. |
|---|---|---|---|---|---|---|
| 1 | 13 | 2-amino-2-ethyl-1,3 propanediol. | 4.8 | Waxy solid | 444 | 16 |
| 2 | 13 | "Ethameen C-15" | 16.2 | Liquid | 730 | 14 |
| 3 | 32.5 | Diethanolamine-lauric acid. | 30.5 | do | 630 | 14 |
| 4 | 13 | Triallylamine | 5.5 | do | 462 | 12 |
| 5 | 13 | Triethanolamine | 5.9 | Waxy solid | 474 | 13 |
| 6 | 26 | Pyridine | 6.4 | Liquid | 404 | 12 |
| 7 | 13 | Tris (hydroxymethyl) amino methane. | 4.8 | Waxy solid | 446 | 14 |
| 8 | 13 | "Armeen 2-C" | 14.1 | do | 678 | 12 |
| 9 | 13 | "Ethomeen C-20" | 25 | Liquid | 950 | 14 |
| 10 | 13 | "Ethomeen C-12" | 10.8 | do | 598 | 12 |
| 11 | 13 | "Ethomeen S-12" | 14.1 | do | 678 | 14 |
| 12 | 13 | "Duomeen T" | 13 | Waxy solid | 650 | 12 |
| 13 | 13 | Dimethylaniline | 4.8 | Liquid | 446 | 14 |
| 14 | 13 | Lauryl dimethyl amine | 8.5 | do | 538 | 12 |
| 15 | 13 | "Ethomeen C-25" | 33.8 | do | 1,150 | 12 |
| 16 | 13 | "Duomeen C" | 9.7 | Waxy solid | 568 | 12 |
| 17 | 32.5 | RAD + "Polyrad 0515" MW. | 48.5 | Liquid | | 14 |

It will be noted that all of the compounds listed in Table I are very effective germicides.

*Table II*

| Example No. | Organo-Metallic | Gm. | Condensate | Gm. | Refractive Index at 15° C. | Specific Gravity (20° C.) | Solubility Ethanol (1:00) | Solubility Water (1:00) |
|---|---|---|---|---|---|---|---|---|
| 18 | TBTC | 32.5 | RAD+5 mol Epichlorhydrin | 78.0 | 1.526 | 1.187 | S | Insoluble. |
| 19 | TBTC | 32.5 | RAD+1 mol Styrene oxide | 43.6 | Solid | Solid | S | Do. |
| 20 | TBTC | 8.1 | RAD+20 mols Propylene oxide | 39.2 | 1.484 | 1.006 | S | Dispresible. |
| 21 | TBTC | 32.5 | RAD+3 mols Propylene oxide | 49.0 | Solid | Solid | S | Insoluble. |
| 22 | TBTC | 32.5 | RAD+4 mols Propylene oxide | 54.8 | Solid | Solid | S | Do. |
| 23 | TBTC | 32.5 | RAD+5 mols Propylene oxide | 60.7 | Solid | Solid | S | Dispersible. |
| 24 | TBTC | 32.5 | RAD+8 mols Propylene oxide | 78.1 | 1.503 | 1.047 | S | Do. |
| 25 | TBTC | 16.3 | RAD+10 mols Propylene oxide | 44.9 | 1.493 | 1.046 | S | Do. |
| 26 | TBTC | 16.3 | RAD+11 mols Propylene oxide | 47.8 | 1.497 | 1.045 | S | Do. |
| 27 | TBTC | 32.5 | RAD+1 mol Butylene Oxides S | 38.8 | Solid | Solid | S | Do. |
| 28 | TBTC | 32.5 | RAD+5 mols Butylene Oxides S | 67.6 | 1.514 | 1.091 | S | |
| 29 | TBTC | 32.5 | "Rosin Amine D" | 31.6 | Solid | Solid | S | Insoluble. |
| 30 | TBTC | 32.5 | "Polyrad" 0100 | 26.0 | 1.532 | 1.152 | S | Do. |
| 31 | TBTC | 32.5 | "Polyrad" 0200 | 40.2 | 1.534 | 1.152 | S | Do. |
| 32 | TBTC | 32.5 | "Polyrad" 0500 | 53.5 | 1.525 | 1.153 | S | Dispersible. |
| 33 | TBTC | 32.5 | "Polyrad" 0515 | 48.5 | 1.528 | 1.146 | S | Do. |
| 34 | TBTC | 32.5 | "Polyrad" 1100 | 79.9 | 1.516 | 1.139 | S | Soluble. |
| 35 | TBTC | 16.3 | "Polyrad" 2000L | 66.5 | 1.505 | 1.33 | S | Do. |
| 36 | TBTC | 8.1 | "Polyrad" 4500 | 53.0 | 1.490 | 1.132 | S | Do. |
| 37 | TBTC | 32.5 | RAD+1 mol Mixed Butylene Oxides | 38.8 | Solid | Solid | S | Insoluble. |
| 38 | TBTC | 32.5 | RAD+5 mcls Mixed Butylene Oxides | 67.6 | 1.528 | 1.113 | S | |
| 39 | Triallyltin chloride. | 27.7 | "Polyrad" 0515 | 48.5 | 1.520 | 1.163 | S | Dispersible. |
| 40 | Trimethallyltin chloride. | 31.9 | "Polyrad" 0515 | 48.5 | 1.536 | 1.157 | S | Do. |
| 41 | Tribenzyltin chlcride. | 42.7 | "Polyrad" 0515 | 48.5 | Solid | Solid | S | Do. |
| 42 | Triphenyltin chloride. | 38.5 | RAD+"Polyrad" 0515 | 48.5 | Solid | Solid | S | Do. |

Other effective materials derived from "RAD" and "Polyrad" compounds are listed in Table II. The second column of Table II specifies the organotin moiety ($R_3Sn$) and gives the weight thereof used, whereas the third column specifies the nature of the condensate moiety (YZ) and gives the weight thereof used. The remaining columns give the properties of the invention product obtained. Unless otherwise noted, the product is a liquid. "Butylene Oxides S" represents a commercial mixture of straight chain butylene oxides. The numerals after "Polyrad" are commercial designations.

The effectiveness of the germicides of the present invention, in comparison with other commercial germicides, is given in Table III. Here, toxic dilution tests for fungistatic and bacteriostatic activity were made in triplicate, using alcoholic solutions of the germicides ranging from dilutions of 1000 p.p.m. to 0.01 p.p.m. Paper disks 10 mm. in diameter were steeped in the solutions, rinsed and dried. Petri dishes seeded with each organism in nutrient agar were inoculated for 24 hours at 37° C. with these disks and the lowest concentration having germicidal activity was recorded in the table. The results, in parts per million, are given for the five germicides tested as follows:

Table III

| Organism | Compound No. 17 of Table I | G11 Grade of Hexachlorophene | TMTD [1] | Salicylanilide | 2, 4, 6 Trichlorphenol |
| --- | --- | --- | --- | --- | --- |
| S. aureus | 0.1 | 2 | 25 | 50 | 3 |
| S. albus | 0.1 | 2 | 25 | 50 | 3 |
| B. subtilis | 0.1 | 2 | 35 | 45 | 3 |
| L. casei | 0.1 | 10 | 50 | 45 | 3 |
| S. faecalis | 1.0 | 40 | 35 | 50 | 3 |
| A. aerogenes | 1.0 | 10 | 50 | 45 | 200 |
| S. typhosa | 0.1 | 10 | 50 | 50 | 3 |
| E. Coli | 0.1 | 50 | 50 | 50 | 3 |
| P. vulgaris | 0.1 | 40 | 50 | 50 | 3 |
| B. ammoniagenes | 0.1 | 40 | 25 | 45 | 200 |
| A. niger | 0.3 | 50 | 50 | 50 | 20 |
| P. expansum | 0.05 | 50 | 50 | 50 | 30 |
| T. mentagrophytes | 0.05 | 50 | 25 | 50 | 20 |

[1] TMTD=Commercial grade of tetramethylthiuram disulfide.

Among the uses for the compounds of the present invention are the control of mold and slime in paper pulp, the control of mildew on burlap or paper bags and on canvas, the control of thrips and aphids on roses, as well as control of bacterial and fungal diseases of bushes and trees. Other uses include rodenticide compositions, compositions for the sanitizing of rugs and upholstery, the mothproofing of woolen fabrics, and the control of such insects as carpet beetles, silverfish, and the like. For such uses, the compounds are preferably dissolved or dispersed in an aqueous medium in the concentration of 0.05 to 1%, or even 5% or as much as 10%, depending on the type of lasting effect to be retained or the price considerations involved. Solubilizers such as alcohol, glycol ethers or esters, ketones, and the like, may be added to the solutions when this phytocidal action is not a factor. In cases where water is objectionable, the germicide may be dispersed in a non-aqueous solvent such as naphtha or chlorinated hydrocarbons. The germicides disclosed herein have been found to be effective against gram-positive and gram-negative bacteria, fungi, algae, and against a large number of insects and other types of parasites.

It has been found that the most suitable germicides of this invention are obtained when reacting the anion-bearing organo tin compound with an organic amine compound having a molecular weight between 31 and 6000, preferably between 50 and 1500.

This application is a continuation-in-part of copending application Serial No. 647,739, filed on March 22, 1957, by Paul A. Mazur, and now abandoned.

I claim:
1. A composition of matter comprising an organometallic compound having the formula:

$$(R_3SnY_bZ_c)_mX$$

wherein R represents an organic hydrocarbon group consisting of alkyl, alkenyl, aralkyl and aryl radicals having 4 to 18 carbon atoms, Sn represents an atom of tin originating from a tri-organo tetravalent tin anion compound, said atom being attached directly to a carbon atom of R, Y represents a rosin amine adductive with Z, Z represents an alkylene oxirane compound reactive with Y and having a molecular weight of 44 to about 200, X represents a halide anion originating from said anion compound, $b$ is a numeral ranging from 1 to 140, representing the molal ratio of Y, $c$ is a numeral ranging from 1 to 40, representing the molal ratio of Z, and $m$ is a numeral ranging from 1 to 3.

2. A composition of matter according to claim 1 comprising a tributyl tin-rosin amine-ethylene oxide condensate.

3. A germicidal composition containing a non-therapeutic material subject to deterioration by microbial action and 0.05% to 10% of an organometallic compound of an anion-bearing tri-organo tetravalent tin compound and a condensation product of a rosin amine with an alkylene oxide of molecular weight below about 200.

4. A germicidal composition containing a non-therapeutic material subject to deterioration by microbial action and 0.05% to 10% of an organometallic compound of tributyl tin chloride and a condensation product of rosin amine and ethylene oxide.

References Cited in the file of this patent
UNITED STATES PATENTS

| 2,510,284 | Haggard | June 6, 1950 |
| 2,580,473 | Sowa et al. | Jan. 1, 1952 |
| 2,772,260 | Yeager | Nov. 27, 1956 |